(12) United States Patent  
Noneman

(10) Patent No.: US 6,735,185 B1
(45) Date of Patent: May 11, 2004

(54) DS/CDMA REVERSE LINK STRUCTURE FOR HIGH DATA RATE TRANSMISSION

(75) Inventor: John Noneman, Valley Center, CA (US)

(73) Assignee: Nokia Mobile Phones Ltd, Espoo (FI)

( * ) Notice: Subject to any disclaimer, the term of this patent is extended or adjusted under 35 U.S.C. 154(b) by 734 days.

(21) Appl. No.: 09/731,469

(22) Filed: Dec. 7, 2000

Related U.S. Application Data

(63) Continuation of application No. 08/997,916, filed on Dec. 24, 1997, now abandoned.

(51) Int. Cl.[7] .............................................. H04B 7/216
(52) U.S. Cl. ...................................... 370/335; 370/478
(58) Field of Search ................................ 370/335, 209, 370/312, 320, 342, 441, 479, 266, 267, 208, 478; 375/130, 146

(56) References Cited

U.S. PATENT DOCUMENTS

| | | | | |
|---|---|---|---|---|
| 5,442,625 A | * | 8/1995 | Gitlin et al. | 370/342 |
| 6,064,663 A | * | 5/2000 | Honkasalo et al. | 370/335 |
| 6,104,746 A | * | 8/2000 | Ishikawa et al. | 375/140 |
| 6,320,842 B1 | * | 11/2001 | Mochizuki | 370/206 |
| 6,567,389 B1 | * | 5/2003 | Honkasalo et al. | 370/342 |
| 6,628,667 B1 | * | 9/2003 | Murai et al. | 370/468 |

* cited by examiner

Primary Examiner—Chi Pham
Assistant Examiner—Alexander O. Boakye
(74) Attorney, Agent, or Firm—Brown, Martin, Haller & McClain

(57) ABSTRACT

Increased data rate transmission in the reverse traffic channel is obtained by modifying a core reverse CDMA traffic channel signal generator and modulator by creating a plurality of parallel pathways, each of which includes a Walsh modulator and a modulo-2 adder which direct-sequence spreads the modulated data using one of a plurality of modified long codes. The DS-spread data signals from each of the parallel pathways are summed and split to the I and Q channels for PN code spreading. The long code variations are obtained by varying one or more bits of the IS-95 standard public long code mask or private long code mask, specifically, one or more bits of the most significant bit (MSB) string of the public long code mask (bits $M_{41}$ through $M_{32}$). Generally, each variable bit provides two possible code channels—one Fundamental Code Channel and $2^b - 1$ Supplemental Code Channels, where b is the number of bits that can be varied within the long code mask. In another embodiment, a multiplexer may be inserted into a core reverse channel sequence prior the PN spreading function to provide dual channel OQPSK that is consistent with existing IS-95 single channel OQPSK. Different levels of service can be selected using different codes and a plurality of multiplexers located in the error detection and encoding front end of the core reverse channel process sequence.

14 Claims, 4 Drawing Sheets

DS/CDMA REVERSE LINK STRUCTURE FOR HIGH DATA RATE TRANSMISSION

This application is a continuation of patent application Ser. No. 08/997,916 filed on Dec. 24, 1997 now abandoned.

FIELD OF THE INVENTION

This invention relates generally to Direct Sequence (DS) Code Division Multiple Access (CDMA) communications systems and more particularly to a code structure and method for increasing data transmission speed in the reverse channel.

BACKGROUND OF THE INVENTION

Mobile wireless communication technology has gained such widespread acceptance that mobile communication devices, which includes mobile phone handsets, pagers, and wireless communicators (integrated digital voice and data communications) are rivaling their land-based counterparts in popularity for use for not only voice communication, but also for data transmission, such as facsimiles, Internet access, electronic mail, messaging, and video transmission. In any wireless communication system, a key goal is to obtain the greatest data throughput for an allocated frequency. However, in each mobile communication technology, the frequency allocations are limited, raising the potential for exceeding a system's capacity with too many users and uses. Digital technologies, which include TDMA (time division multiple access), digital FDMA (frequency division multiple access), and code division multiple access (CDMA) provide increased subscriber capacity of the allocated bandwidths as well as to provide higher quality signals for transmission. In digital communications systems, clarity and throughput of the transmitted information is controlled by the amount of data that can be transmitted over a given channel within the allocated spectrum. For every increase in the data rate, there is a corresponding increase in the quality of the call, i.e., the voice clarity, and/or the amount of other data that can be transmitted, which may be control information for the transmission itself or data to be communicated from one site to another.

The reverse link, or reverse channel, is the one-way communication from the mobile unit to a base station. Information on the reverse channel consists of primary traffic (voice or data), secondary traffic (data), and signaling using frames of having lengths, in IS-95-based systems, of 20 ms each. Conventional reverse links transmit a stream of digitally-encoded RF packets which consist of digitally-encoded voice (or data) packets interspersed with digitally-encoded power adjustment commands. The use of a packet configuration for data transmission, along with the unique coding, permits a single frequency channel to be simultaneously used for transmission of many different signals. According to the Telecommunications Industry Association/Electronic Industries Association (TIA/EIA) IS-95 standard, "Mobile Station-Base Station Compatibility Standard for Dual-mode Wideband Spread Spectrum Cellular Systems", IS-95-based CDMA systems may transmit data for a single call reverse link at one or four different rates: 9600 bits per second (bps), 4800 bps, 2400 bps, or 1200 bps for rate set 1. In the IS-95 standard, a frame is defined as a 20 ms burst of digitally-encoded data consisting of sixteen equal length power control groups (PCG). Each power control group consists of six 64-ary Walsh codes. Since a 64-ary Walsh code carries six bits of baseband data, the conventional Walsh coded IS-95 frame may carry 6×6×16 bits, for a total of 576 baseband bits or code symbols. The 576 coded bits are convolutionally decoded by a rate_decoder to obtain 192 bits per frame (at 9600 bps.) Of these 192 bits, 172 bits are information bits, which presents a significant limiting factor for reverse channel data rates under the current standards. (The remaining bits comprise twelve frame quality bits and eight encoder tail bits.)

Methods have been proposed for increasing the number of data bits that can be transmitted during a given time period. One such method is described in U.S. Pat. No. 5,465,269 of Schaffner, et al., in which a supplementary signal is provided using differential coherent modulation of the in-phase (I) and quadrature phase (Q) signals by 180□. (The disclosure of this patent is incorporated herein by reference.) This method provides as many as 96 additional data bits, and therefore, is well suited for transmitting relatively simple control information such as power control commands. However, this 50% increase in the number of data bits is not sufficient to accommodate the demands for data rates of several times the current data rate capabilities.

FIG. 1 provides a block diagram of a basic prior art core process sequence for generating and modulating one reverse CDMA channel. The quality/CRC (cyclic redundancy check) indicator 102, convolutional encoder 103 for error detection and correction, repeater 104, which maintains a constant input to block interleaver 105. Interleaver 105 ensures that sequential data is randomly distributed to combat the effects of Rayleigh fading. The data stream is then fed through modulator and spreading block 101. Walsh modulator 106 outputs one Walsh function for every six input symbols. Data burst randomizer 107 provides variable rate transmission capability. At modulo-2 adder 108, the long code mask from long code generator 109 is used to direct-sequence (DS) spread the signal output by modulator 106. The DS spread signal is split to modulo-2 adders 110 and 111 where it is spread in quadrature with the I (in phase) and Q (quadrature) PN sequences. The Q channel has a half-chip delay 112 added to create an offset (OQPSK), and the I and Q channels are filtered by baseband filters 113 and 114, respectively, to limit the signals to the appropriate transmission bandwidth. The I and Q channels are modulated by the I and Q carrier signals at mixers 115 and 116, respectively, combined together at adder 117, and sent to the antenna (not shown.)

As is known, the reverse CDMA channel consists of $2^{42}-1$ logical channels, with one logical channel permanently and uniquely associated with each mobile station, thus providing means for addressing and identifying multiple mobile stations over a common CDMA channel. This addressing is accomplished through manipulation of the long code, which is a period $2^{42}-1$ LFSR (linear feedback shift register) sequence, that is used for spreading the reverse link. There is only one long code sequence, with different mobile stations being distinguished by the relative phase of the long code. The long code mask is a 42-bit number which is used to select specific bits from the long code. It is this long code mask that serves as the reverse link address. Under the IS-95 standard, when transmitting on an access channel, a mobile station constructs the 42-bit long code mask from a fixed nine bit sequence ("110001111") (bits $M_{41}$ through $M_{33}$), the access channel number (ACN: bits $M_{32}$ through $M_{28}$), the paging channel number (PCN: bits $M_{27}$ through $M_{25}$), the base station identity (BASE_ID: bits $M_{24}$ through $M_9$), and the pilot PN (pseudorandom noise) offset for the forward CDMA channel (PILOT_PN: bits $M_8$ through $M_0$). (See, e.g., IS-95, Section 6.1.3.1.8-2). When transmitting on a reverse traffic channel, the mobile station uses a long code mask constructed from its electronic serial number (ESN (permuted): bits $M_{31}$ through $M_0$), along with a fixed ten bit sequence ("1100011000") (bits $M_{41}$ through $M_{32}$). Under IS-95, this latter code is designated the "Public Long Code Mask". The ESN of a mobile station cannot be readily altered, thus providing a level of privacy protection for the mobile user. The IS-95 standard also provides for an alternate private identification number (private long code) which may be used in place of the ESN. Under the current standards, the initial ten bit sequence is not varied in any way, thus providing a stable code, currently not allocated for any other purpose.

SUMMARY OF THE INVENTION

It is an advantage of the present invention to utilize existing code structures within the IS-95 standard to provide a significant increase in the data rate of transmitted signals.

It is another advantage of the present invention to provide the ability within an IS-95-based system to select the quality of communication services provided within a CDMA network.

Still another advantage of the present invention is to provide means for selecting and utilizing multiple channels in parallel using a modified long code mask.

In an exemplary embodiment, increased data rate transmission in the reverse traffic channel is obtained by providing a core front end, consisting of reverse CDMA channel signal generators and modulators, which provide inputs to a number of parallel pathways consisting of a Walsh modulator and a modulo-2 adder which direct-sequence spreads the modulated data using one of a plurality of unique modified long code masks. The DS-spread data signals from each of the parallel pathways are summed and split to the I and Q channels for PN code spreading. The long code variations are obtained by varying one or more bits of the IS-95 standard public long code mask, specifically, one or more bits, such as the least significant bit(s) (LSB), of the most significant bit (MSB) string of the public long code mask. In one embodiment the two LSBs, bits 32–33, are varied to create four parallel channels, consisting of a Fundamental Code Channel and three Supplemental Code Channels. Generally, for b variable bits there are $2^b$ possible code channels—one fundamental code channel and $2^b-1$ supplemental channels.

In the preferred embodiment, the front end pathway, consisting of a frame quality indicator, encoder, repeater, and block interleaver, is modified to provide an enhanced data rate signal which is then distributed to the parallel modulator/spreading pathways. In this embodiment, the distribution of data into the parallel modulator/spreading blocks is in accordance with IS-95 standards such that the output of the interleaver is grouped into six bits for input to each Walsh modulator. For example, a switching means could be closed to deliver a portion of the data stream to that pathway, then that switch would be opened and the switch for the next pathway closed. Proceeding in this fashion, the high data rate output from the interleaver of the enhanced pathway can be distributed among the modulator blocks to form six bit groups. Modulation of each path then occurs in the same way and at the same rate as the prior art core reverse channel.

In another embodiment, a multiplexer is inserted into a core reverse channel sequence after the modulator/spreading sequence and prior to the PN spreading function. Two or more modulation and spreading blocks are provided, each being associated with a different long code mask. The multiplexer multiplexes the outputs of the modulation/spreading blocks to produce a signal which is consistent with existing IS-95 single channel OQPSK. A combination of parallel pathways within two spreading blocks makes it possible to obtain $2 \square 2^b$ times the data rate of a conventional single channel. Each modulation/spreading block may consist of one or more modulation/spreading sequences, with each sequence corresponding to a different long code mask. In such a combination, the feed to the multiplexer is obtained from the summed signals of the parallel pathways.

In yet another embodiment, different levels of service can be selected using different codes and a plurality of multiplexers located in the error detection and encoding front end of the core reverse channel sequence. Uncoded service can be selected for use in non-mobile channels of very small microcells or picocells, where power control is not a significant problem by bypassing the error detection/encoding segment of the core reverse channel sequence. In this configuration, the data signal is fed directly into an input of a first multiplexer disposed upstream from the repeater. Standard $10^{-3}$ BER (bit error rate) service can be provided by inputting the encoded signal downstream from the frame quality indicator and the convolutional encoder to the first multiplexer prior to the repeater. The output of the frame quality indicator is multiplexed with a signal comprising eight tail bits for input into the convolutional encoder by a second multiplexer. A higher quality $10^{-6}$ BER service can be made available by encoding the data signal using a Reed-Solomon encoder and connecting the output of that encoder to a third multiplexer to be multiplexed with the signal encoded by the frame quality indicator. The rate of the Reed-Solomon code can be changed in order to provide different quality levels. The output of the third multiplexer is multiplexed with the eight tail bit signal by the second multiplexer. Once the various quality-level signals are input to the repeater, the subsequent operations, including interleaving, modulation and spreading are performed as previously described. The service quality level may be selected by varying designated bits within the long code mask, and may be associated with multi-channel operation.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to like parts, and in which.

DETAILED DESCRIPTION OF THE PREFERRED EMBODIMENTS

The following detailed description utilizes a number of acronyms which are generally well known in the art. While definitions are typically provided with the first instance of each acronym, for convenience, Table 1 below provides a list of the acronyms and abbreviations and their respective definitions.

TABLE 1

| ACRONYM | DEFINITION |
|---------|------------|
| BCH | Bose-Chaudhuri-Hocquenghem |
| BER | Bit Error Rate |
| CDMA | Code Division Multiple Access |
| CRC | Cyclic Redundancy Check |
| DS | Direct Sequence |
| EIA | Electronics Industry Association |
| ESN | Electronic Serial Number |
| FDMA | Frequency Division Multiple Access |
| IS | Interim Standard |
| LFSR | Linear Feedback Shift Register |
| LSB | Least Significant Bit |
| MSB | Most Significant Bit |
| OQPSK | Offset Quadrature Phase Shift Keying |
| PCG | Power Control Group |
| PN | Pseudorandom Noise |
| RFCC | Reverse Fundamental Code Channel |
| RSCC | Reverse Supplemental Code Channel |
| TDMA | Time Division Multiple Access |
| TIA | Telecommunications Industry Association |

Figure 1:
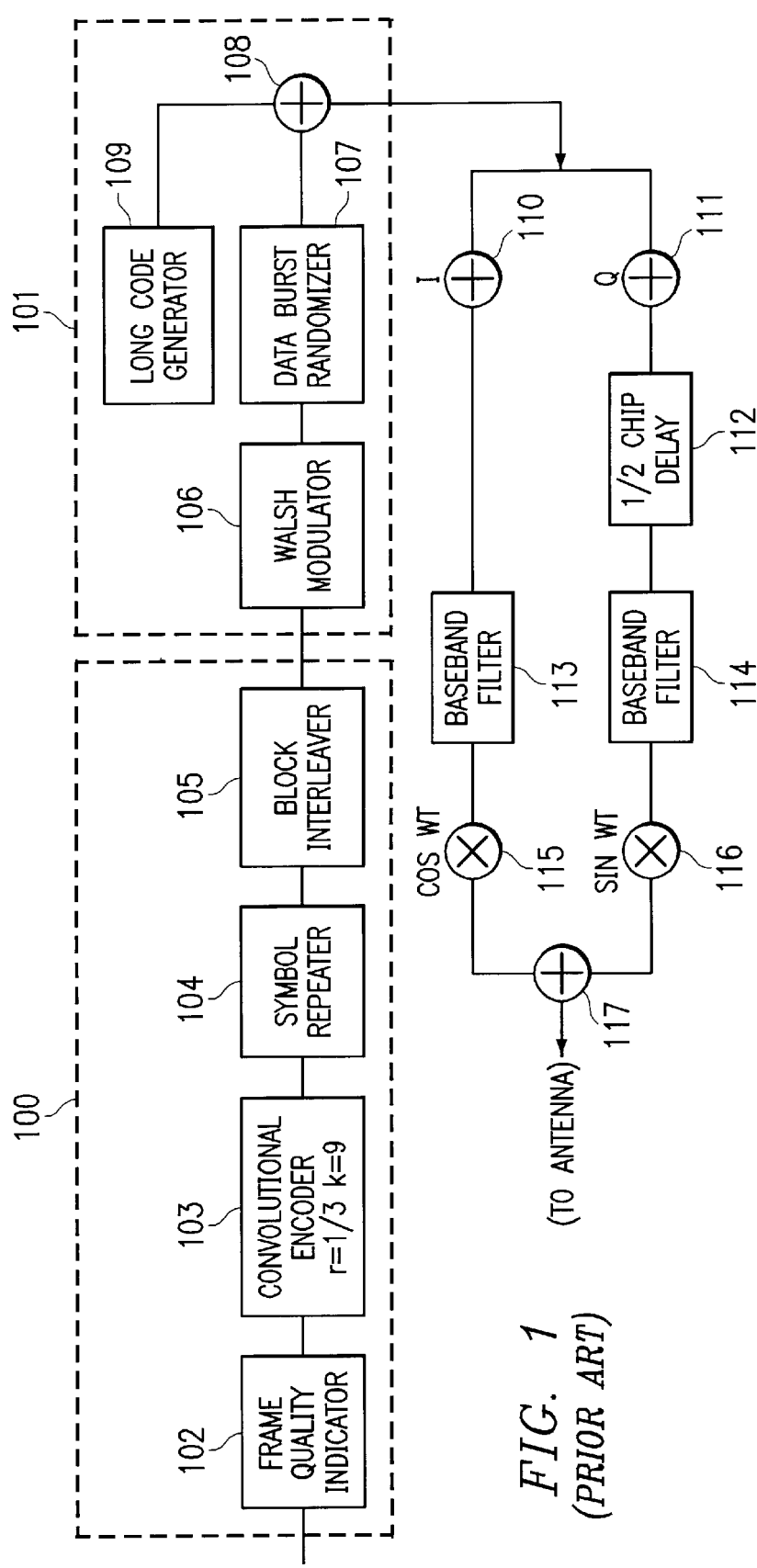
FIG. 1 is a block diagram of a prior art core reverse channel sequence.
Figure 2:
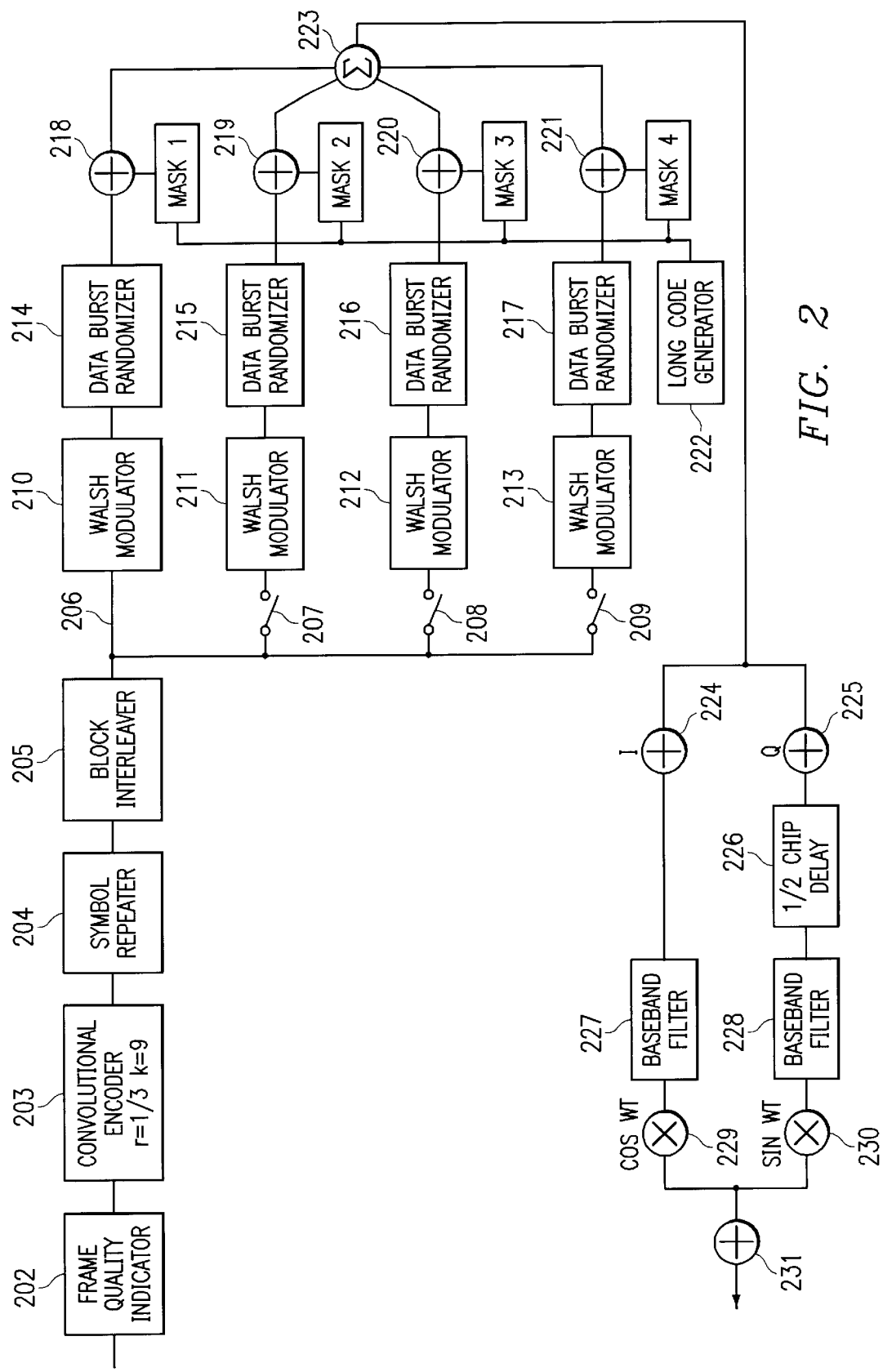
FIG. 2 is a block diagram of reverse channel sequence for providing parallel channels for high speed data transmission.

Referring to FIG. 2, the process sequence for generation and modulation of four parallel reverse traffic channels is shown. It should be noted that while the example of four parallel channels is shown and described, the number of channels may vary based upon the number of code bits designated for this function.

As shown, the basic front end of the generation sequence is the same as that for the prior art sequences. Specifically, the incoming data signal is fed through frame quality indicator 202 and convolutional encoder 203 (rate _) for error detection and correction, and to repeater 204, to maintain a constant input to block interleaver 205. In the preferred embodiment, a single front end grouping 202–205 is used, however, that front end grouping must be modified to handle an enhanced data rate. Modification to a higher data rate while maintaining the appropriate code structure dictated by the IS-95 standard is within the level of skill in the art. Alternatively, four duplicate front ends 202–205 may be provided, each of which handles a separate input data signal at the standard data rate, each defining a different pathway 206–209.

The data burst randomizer within each of the duplicate front ends is modified so that, when there is to be no data transmitted from that path during a corresponding power control group, the output from the randomizer is masked such that there is no contribution to the summer from that path. The modification to the randomizer will be based upon the highest encoding rate for the particular path.

Depending upon the front end configuration (enhanced single or duplicate front end), the output signal from interleaver 205 is either distributed into four signals from the enhanced single pathway 206, or fed directly from the corresponding pathway of the duplicate front end pathways 206–209 to Walsh modulators 210–213, data burst randomizers 214–217 and modulo-2 adders 218–221. The distribution into the duplicate front end pathways 206–209 can be based upon time, a number of bits, or any appropriate means for dividing up the data stream into segments for distribution. Generally, the means for dividing up the data stream is dictated by the IS-95 standard relating to interleaver and Walsh modulator operation. For example, as illustrated, a switching means could be closed to one pathway to deliver a portion of the data stream to that pathway, then that switch would be opened and the switch for the next pathway closed after six bits had been delivered to the previous pathway. Each of the pathways 206–209 plus their corresponding Walsh modulators, randomizers and adders function in the same manner as the single pathway of the prior art modulation and spreading sequence, with the direct spreading being based upon a modified long code mask generated by long code generator 222. (It should be noted that operation of the data burst randomizers should be based on the highest data rate of any of the paths, e.g., full rate or half rate.) Four distinct long code masks are generated by varying two bits within the ten bit MSB string of the long code mask, which consists of bits $M_{41}$ through $M_{32}$.

Figure 3:
FIG. 3 is a diagram of a modified long code mask for accessing parallel reverse channels.
Figure 4:
FIG. 4 is a diagram of an alternate modified long code mask for accessing parallel reverse channels.

Referring now to FIG. 3, a diagram of the modified long code mask is shown. As in the IS-95 public long code mask, bits $M_{31}$ through $M_0$ are based on a permutation of the mobile station's ESN. In this first example, bits $M_{33}$ and $M_{32}$ are variable, as indicated by the X's, providing four possible variations of "00", "01", "10" and "11". For bits $M_{33}$ and $M_{32}$, the "00" variation corresponds to the current IS-95 long code mask and, thus, would be considered the Reverse Fundamental Code Channel (RFCC). The remaining three variations are Reverse Supplemental Code Channels (RSCCs). In another variation of the long code mask, which is shown in FIG. 4, three bits (bits $M_{39}$ and $M_{37}$) are variable, thus providing for one RFCC ("000") and seven RSCCs ("001–111"). The total number (n) of parallel channels that are possible is determined by the number of bits designated for channel selection, according to the relationship $n=b^2$ where b is the number of variable bits. The IS-95 standard requires the long code be periodic with $2^{42}-1$ chips and satisfy a polynomial-specified linear recursion. (See IS-95, Section 6.1.3.1.8, "Direct Sequence Spreading".) Therefore, the number of bits that may be varied must not change the compliance of the long code with these requirements. Since means must be provided to distinguish between the access channel long code mask and the public (or private) long code mask, it may be desirable to keep several bits within the ten MSBs non-variable, e.g., three bits. Thus, assuming all other limitations are met, one could theoretically access $2^7$, or one hundred twenty eight parallel access channels, although the CDMA channel capacity would likely limit this number significantly.

Referring again to FIG. 2, the direct spread signals from adders 218–221 are combined at summer 223 to create a single signal which is then split for in-phase (I) and quadrature (Q) spreading at modulo-2 adders 224 and 225 in the same manner as in the prior art PN spreading sequence. For OQPSK, a ½ chip delay is introduced into the Q-channel at delay 226, and both the I- and Q-channels are baseband filtered at filters 227 and 228, respectively. The I- and Q-channels are modulated by the I and Q carrier signals at mixers 229 and 230, respectively, combined together at adder 231, and sent to the antenna (not shown) for transmission.

Figure 5:
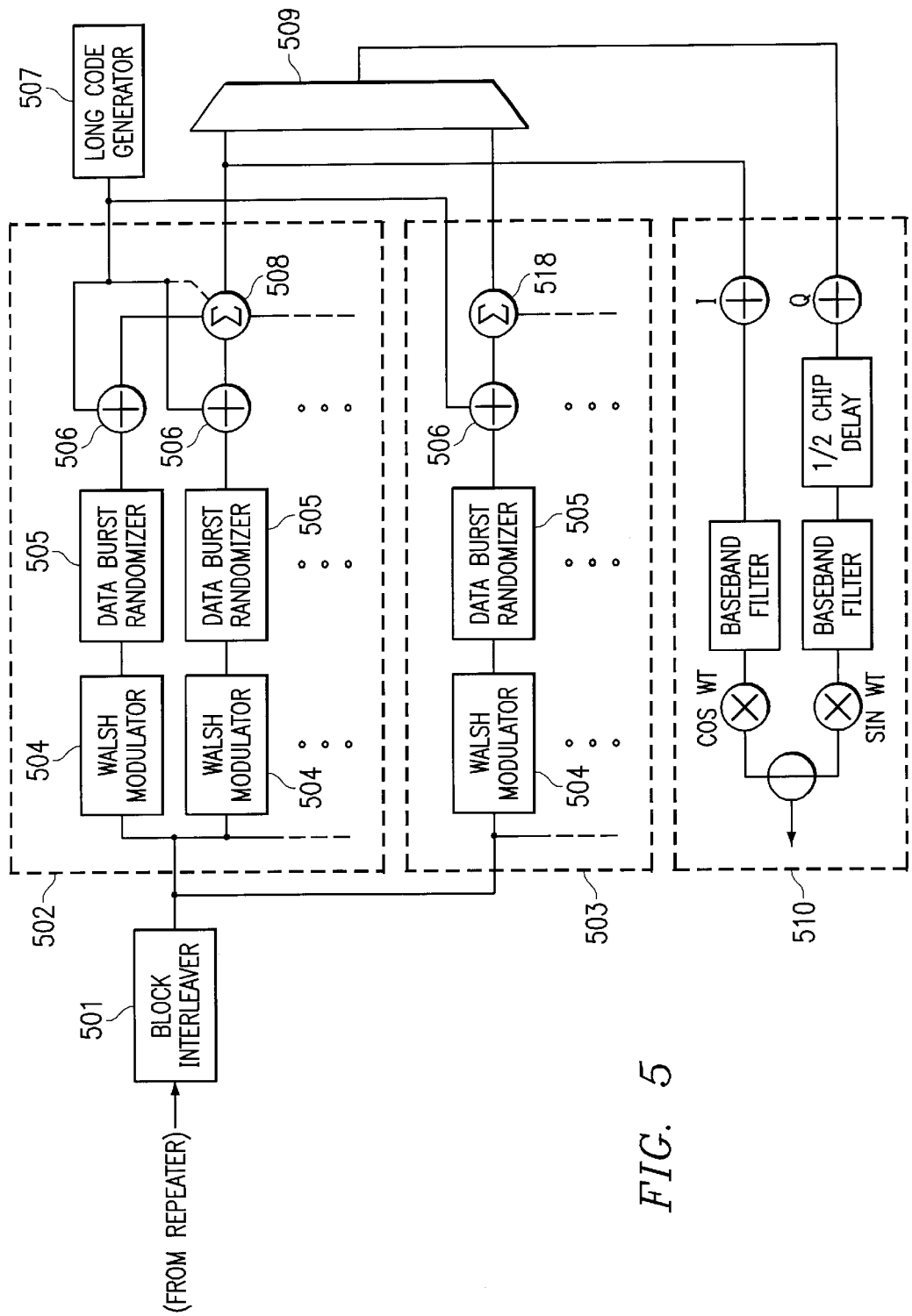
FIG. 5 is a block diagram of modulation and spreading blocks and the transmission block of an alternate embodiment for providing parallel reverse channels.

Referring to FIG. 5, a dual channel OQPSK signal can be formed by providing two separate modulation and spreading blocks 502 and 503, each containing at least one pathway consisting of a Walsh modulator 504, data burst randomizer 505, and modulo-2 adder 506 for direct-spreading according to long code mask 507. As illustrated, block 502 has two pathways with dashed lines indicating two possible additional pathways, and includes summer 508. Block 503 has one pathway shown with dashed lines indicating three possible additional pathways. As will be apparent, summer 518 will be needed only where multiple pathways are provided within block 503. The output signal from interleaver 501 is provided to each of blocks 502 and 503. The outputs of the modulation and spreading blocks 502 and 503 are fed to multiplexer 509 which provides an input to the Q-channel in PN spreading and transmission block 510. Input to the I-channel in block 510 is provided by modulation and spreading block 502 alone. Thus, the Q-channel input is multiplexed between blocks 502 and 502. Alternatively, the multiplexed signal can fed into the I-channel, with the Q-channel receiving the input only from a single modulation and spreading block 502 or 503.

PN spreading and transmission block 510 follows the standard sequence structure. With each block 502 and 503 containing a single modulation/spreading pathway, a dual channel capability is provided. By combining the multi-pathway modulation/spreading sequences so that both blocks 502 and 503 have n parallel pathways (e.g., two of the modulation/spreading blocks as shown in the embodiment of FIG. 2), it is possible to obtain up to a 2n increase in data rate. Following the example of four pathways in each block, the data rate is multiplied by eight, by providing 2n, or eight, parallel channels. It should be noted that the number of modulation/spreading sequences within each block 502 and 503 need not be equal, in which case, the total number of parallel channels would be the sum, of the number of parallel sequences in each of block 502 and 503.

Revision of the IS-95 standard will be required to accommodate the multiple channel configuration of the present invention. The following text provides the proposed revision of Sections 6.1.3.1.8 as follows:

When a mobile station is transmitting on n code channels, i.e., the Reverse Fundamental Code Channel (RFCC) and n–1 Reverse Supplemental Code Channel(s) (RSCC), the mobile station shall use each of the code channels one or two long code masks unique to that code channel: either a public long code mask unique to the mobile station's ESN (referring to the public long code structure of FIG. 4), or a private long code mask, with the following modification: The RFCC shall be assigned to channel number "0", and each of the n–1 RSCCs shall be assigned the numbers "1" through "n–1". Bits $M_{39}$ through $M_{37}$ of the public or private long code mask for assigned code channel I, where 0<i<(n–1)£ NUM__$_{REV}$__CODES, shall be XORed with the value I. NUM__REV__CODES is the currently active number of channels received in a Supplemental Channel Assignment Message. Bits $M_{31}$ through $M_0$ shall be set to a permutation of the mobile station's ESN bits in an identical manner to bits $M_{31}$ through $M_0$ on the RFCC. The resulting Public Long Code Mask Format for RSCCs is provided in FIG. 4.

Different levels of service quality can be selected using multiplexing at the front end of the reverse traffic channel sequence. The highest quality level of service would correspond to the highest data rate. For example, referring briefly to FIG. 2, two or more pathways 206–209 would be used to provide the highest data rate transmission. Mid-quality service, which corresponds to current IS-95 standards would use one pathway with no summing or multiplexing. Uncoded service would bypass the frame quality indicator and convolutional encoder.

Figure 6:
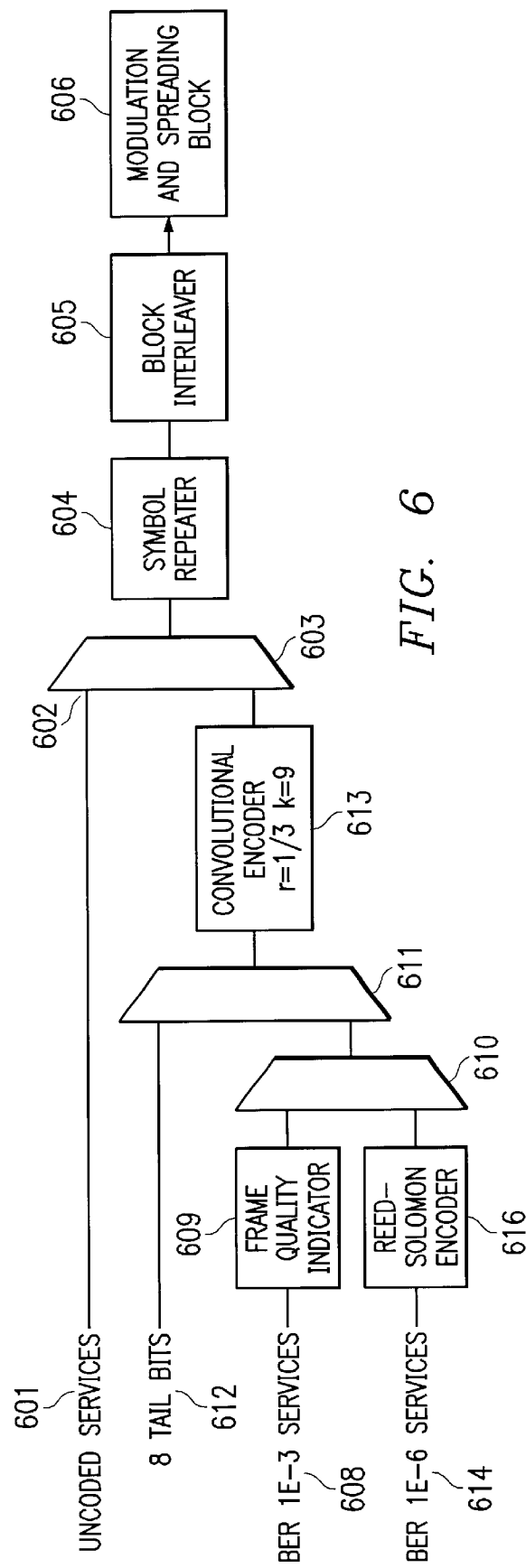
FIG. 6 is a block diagram of the front end of a reverse channel sequence for providing different levels of service quality.

Referring now to FIG. 6, three possible levels of service quality are depicted. The lowest quality level, which involves no error coding, may be appropriate for very small microcells, or picocells, with non-mobile channels, such as within a building, where power level variations and other forms of interference are not likely to be encountered. For uncoded services 601, the data signal is connected directly to the input 602 of first multiplexer 603. The output of multiplexer 603 feeds repeater 604, interleaver 605 and on to modulation and spreading block 606.

A middle quality level service 608, such as the current IS-95 standard $10^{-3}$ BER service is obtained by connecting the data signal to frame quality indicator 609, which encodes the signal in accordance with known techniques, and to second multiplexer 610. The output of multiplexer 610 is fed to an input of third multiplexer 611 for multiplexing with a signal comprising eight encoder tail bits 612. The output of multiplexer 611 is connected to__rate, K=9 code convolutional encoder 613 for error detection/correction in accordance with known methods. The output of convolutional encoder 613 is multiplexed with the uncoded services signal by multiplexer 603.

The highest quality signal level 614, here shown as having a $10^{-6}$ BER, is obtained by performing Reed-Solomon (RS) error encoding on the input data signal at Reed-Solomon encoder 616 instead of error encoding via frame quality indicator 609. As is known, frame quality indicators are widely implemented using CRC (Cyclic Redundancy Check) coding based upon simple linear shift registers, which is capable of detecting and correcting errors on a bit-by-bit basis. Such coding typically falls within the class of binary BCH (Bose-Chaudhuri-Hocquenghem) codes. The RS code is an extension of BCH code from binary to non-binary code, which provides a more sophisticated error correction on the symbol level by converting binary sequences to m-bit parallel data. (See, e.g., Chapter 6, "Error Control Techniques", S. Sampei, *Applications of Digital Wireless Technologies to Global Wireless Communications*, Prentice Hall PTR, 1997, the disclosure of which is incorporated herein by reference.) The code rate, or number of symbols corrected, e.g., single-symbol, two-symbol, etc., can be varied to provide different sub-levels of service quality within the highest quality service level. The service levels and sublevels are selected by the network and communicated to the mobile based upon the intended application of the communication and on the communication environment. For example, if there is a high level of interference in a particular area, the network may tell the mobile to utilize a higher service level, e.g., BER=$10^{-6}$, just to make sure that a voice transmission has an acceptable clarity. In an area where interference is not a significant problem, voice transmissions may be at a lower service level, e.g., BER=$10^{-3}$, while a transmission to a mobile computer may be set at a higher service level (BER=$10^{-6}$) in order to effectively handle a higher volume of data. The instructions for selection of service level may, for example, be provided via standard messaging signals in accordance with the IS-95 standard.

Since implementation of the different service quality levels is entirely at the front end of the reverse traffic channel generation sequence, and produces a single channel for input to the modulation and spreading block, this option may be readily combined with the multiple parallel channels provided in the embodiments of FIGS. 2 and/or 5. Using a conventional front end sequence, multiple input signals are combined after spreading and RF modulation to provide an output signal which complies with IS-95 standards, i.e., a single channel OQPSK signal for transmission from the mobile station.

Considering the example of FIG. 2 with four parallel channels, the fourfold increase in the number of combined information and control bits permits selection of service quality levels, incorporation of sophisticated control schemes, and large quantities of data to be included in each frame for use in applications including overlaid voice and data communication, real time video transmission and conferencing, rapid accessing of networks for mobile computing.

Other embodiments and modifications of the present invention will occur readily to those skilled in the art in view of these teachings. Therefore, this invention is to be limited only by the following claims, which include other embodiments and modifications when viewed in conjunction with the above specification and accompanying drawings.

I claim:

1. A reverse channel structure for providing high speed data transmission within a CDMA communications network, wherein the reverse channel structure has at least one front end sequence including a repeater and an interleaver, the interleaver outputting a data stream, the reverse channel structure comprising:

a plurality of modulator/spreading pathways for receiving the data streams in parallel, each modulator/spreading pathway comprising a Walsh modulator and a modulo-2 adder, each modulo-2 adder receiving a spreading code signal for generating a direct-sequence spread signal;

a long code generator for generating a plurality of shifted long code phases using a plurality of long code masks, one shifted long code phase corresponding to each long code mask, each long code mask comprising a string of bits, a first portion of the string of bits being fixed and a second portion of the string of bits being variable for selecting one of a plurality of parallel code channels, wherein the string of bits in each long code mask comprises forty-two bits, the first portion of the string of bits comprises a permuted electronic serial number comprising thirty-two least significant bits of the forty-two bits plus (10 minus b) of ten most significant bits of the forty-two bits, and the second portion comprises b bits, wherein one of the plurality of shifted long code phases provides the spreading signal for each modulator/spreading pathway so that the direct-sequence spread signal generated by each modulator/spreading pathway is spread on a different code channel; and means for combining a plurality of direct-sequence spread signals generated by the plurality of modulator/spreading pathways and generating a single multi-channel signal therefrom for quadrature spreading and transmission.

2. The reverse channel structure of claim 1, wherein b is two and the plurality of parallel code channels comprises four parallel code channels.

3. The method of claim 1, further comprising selecting a quality level of service comprising the steps of:

first multiplexing an uncoded input data stream with an encoded input data stream to generate a first multipexed data stream;

repeating and interleaving the first multiplexed data stream prior to the step of inputting the data stream into the plurality of parallel sequences;

wherein the uncoded input data stream corresponds to a lower quality level service than the encoded input data stream.

4. The method of claim 3, wherein the encoded input data stream is bit error corrected by a frame quality indicator, second multiplexed with a tail bit string and convolutionally encoded to provide a mid-level quality service.

5. The method of claim 4, wherein the encoded input data comprises a bit error-corrected data stream third multiplexed with a symbol error-corrected data stream, a third multiplexed data stream being second multiplexed with a tail bit string and convolutionally encoded, wherein the bit error-corrected data stream corresponds to a mid-level quality service and the symbol error-corrected data stream corresponds to a high-level quality service.

6. The method of claim 5, wherein the symbol error-corrected data stream is processed by a Reed-Solomon encoder.

7. A reverse channel structure for providing high speed data transmission within a CDMA communications network, wherein the reverse channel structure has at least one front end sequence including a repeater, a convolutional encoder upstream from the repeater and an interleaver, the interleaver outputting a data stream, the reverse channel structure comprising:

a plurality of modulator/spreading pathways for receiving the data streams in parallel, each modulator/spreading pathway comprising a Walsh modulator and a modulo-2 adder, each modulo-2 adder receiving a spreading code signal for generating a direct-sequence spread signal;

a long code generator for generating a plurality of shifted long code phases using a plurality of long code masks, one shifted long code phase corresponding to each long code mask, each long code mask comprising a string of bits, a first portion of the string of bits being fixed and a second portion of the string of bits being variable for selecting one of a plurality of parallel code channels, wherein the shifted long code phase provides the spreading signal for each modulator/spreading pathway so that the direct-sequence spread signal generated by each modulator/spreading pathway is spread on a different code channel;

means for combining a plurality of direct-sequence spread signals generated by the plurality of modulator/spreading pathways and generating a single multi-channel signal therefrom for quadrature spreading and transmission; and a first multiplexer having two inputs, a first input for bypassing the convolutional encoder for obtaining an uncoded service, and a second input for an error-corrected service, the first multiplexer having an output connected to an input of the repeater.

8. The reverse channel structure of claim 7, further comprising a frame quality indicator and a second multiplexer having a first input comprising a tail bit signal and a second input from the frame quality indicator, and having an output connected to the convolutional encoder, wherein the frame quality indicator detects and corrects bit errors in the data stream to provide a mid-level quality error-corrected service.

9. The reverse channel structure of claim 8, further comprising a Reed-Solomon encoder and a third multiplexer having a first input comprising an output of the frame quality indicator and a second input comprising an output of the Reed-Solomon encoder, and having an output connected to the second input of the second multiplexer, wherein the Reed-Solomon encoder detects and corrects symbol errors in the data stream to provide high-level quality error-corrected service.

10. A method for increasing a data transmission rate over a reverse channel in an IS-95 based CDMA communications network comprising:

inputting a data stream into a plurality of parallel sequences for modulating and spreading the data stream;

varying a phase of a long code used for spreading the data stream so that each parallel sequence of the plurality of parallel sequences uses a uniquely phased long code, whereby a plurality of different code channels are created; and combining the plurality of different code channels into a single signal prior to quadrature spreading and transmission over the reverse channel.

11. The method of claim 10, wherein the step of varying the phase of the long code includes varying at least one bit within a forty-two bit public long code mask.

12. A method of claim 10, wherein the step of combining comprises summing the plurality of code channels.

13. A method for increasing a data transmission rate over a reverse channel in a CDMA communications network comprising:

distributing an input data stream into a plurality of data stream segments for input to a plurality of modulation/spreading sequences, each modulation/spreading sequence of the plurality having a first uniquely phased long code associated therewith;

spreading within the plurality of modulation/spreading sequences the plurality of data stream segments, each according to one of a plurality of second uniquely phased long codes derived from said first uniquely phased long code, wherein each second uniquely phased long code is derived from said first uniquely phased long code by varying at least one bit within a forty-two bit long code mask to provide a plurality of parallel code channels;

generating a plurality of different code channels therefrom;

combining the plurality of different code channels;

spreading the combined plurality of different code channels to generate a quadrature spread signal; and transmitting the quadrature spread signal over the reverse channel.

14. An apparatus for increasing data transmission rate over a reverse channel in a CDMA communications network, said apparatus comprising:

a front end for receiving an input data stream and distributing the input data stream into a plurality of data stream segments;

a plurality of modulator/spreading pathways, each coupled to the front end and having a first uniquely phased long code associated therewith, and each for receiving one of said plurality of data stream segments and spreading the one of said plurality of data stream segments according to one of a plurality of second uniquely phased long codes derived from the first uniquely phased long code, wherein each second uniquely phased long code is derived from said first uniquely phased long code by varying at least one bit within a forty-two bit long code mask to provide a plurality of parallel code channels, and, generating a plurality of different code channels therefrom;

a combiner, coupled to the plurality of modulator/spreading pathways, the combiner for combining the plurality of different code channels to generate a combined plurality of different code channels;

a spreader coupled to the combiner, the spreader for spreading the combined plurality of different code channels to generate a quadrature spread signal; and a transmitter coupled to the spreader, the transmitter for transmitting the quadrature spread signal over the reverse channel.

* * * * *